(12) United States Patent
Miedema et al.

(10) Patent No.: US 10,972,359 B2
(45) Date of Patent: Apr. 6, 2021

(54) DATA STRUCTURES REPRESENTING MODELS OF NETWORKING EQUIPMENT AND METHODS OF NETWORK MANAGEMENT EMPLOYING THEREOF

(71) Applicant: Ciena Corporation, Hanover, MD (US)

(72) Inventors: David Miedema, Ottawa (CA); Bruno Doyle, Ottawa (CA); Edward Chen, Kanata (CA); Anurag Prakash, Kanata (CA)

(73) Assignee: Ciena Corporation, Hanover, MD (US)

( * ) Notice: Subject to any disclaimer, the term of this patent is extended or adjusted under 35 U.S.C. 154(b) by 82 days.

(21) Appl. No.: 15/977,021

(22) Filed: May 11, 2018

(65) Prior Publication Data
US 2019/0349262 A1 Nov. 14, 2019

(51) Int. Cl.
*H04L 12/24* (2006.01)
*G06F 16/28* (2019.01)

(52) U.S. Cl.
CPC .......... *H04L 41/145* (2013.01); *G06F 16/288* (2019.01); *H04L 41/0803* (2013.01); *H04L 41/12* (2013.01)

(58) Field of Classification Search
CPC ................. G06F 8/355; G06F 8/10
See application file for complete search history.

(56) References Cited

U.S. PATENT DOCUMENTS 5,956,719 A * 9/1999 Kudo .................. H04L 41/0233
707/610
2008/0126407 A1* 5/2008 Shimaoka ................ G06F 8/10

OTHER PUBLICATIONS

Bjorklund, et al, (YANG—A Data Modeling Language for the Network Configuration Protocol (NETCONF), Internet Engineering Task Force, Request for Comment: 6020, Oct. 2010 (Year: 2010).*

* cited by examiner

*Primary Examiner* — John M Macilwinen
*Assistant Examiner* — Christopher P Cadorna
(74) *Attorney, Agent, or Firm* — Clements Bernard Walker; Lawrence A. Baratta, Jr.; Christopher L. Bernard (57) ABSTRACT

A processor-implemented method implemented to model devices in a network utilizing an assembly providing an arbitrary model includes utilizing one or more first models to represent relationships between devices in the network for control and management thereof, wherein the one or more first models are implemented in an associated database of one or more databases each with an associated schema; defining an assembly to implement the arbitrary model different from the first model, wherein the assembly comprises pointers to data instances in the one or more databases; and utilizing the arbitrary model for control and management of the devices in the network, wherein the control and management via the arbitrary model updates the data instances in the one or more databases representing the first model.

20 Claims, 4 Drawing Sheets

DATA STRUCTURES REPRESENTING MODELS OF NETWORKING EQUIPMENT AND METHODS OF NETWORK MANAGEMENT EMPLOYING THEREOF

FIELD OF THE DISCLOSURE

The present disclosure generally relates to software models for networking equipment for network management and control. More particularly, the present disclosure relates to systems and methods for efficiently representing models of network equipment through assemblies which allow original models to be joined together without redefining the original model.

BACKGROUND OF THE DISCLOSURE

In networking equipment, models are software constructs used to represent hardware and services, and represent the associated configuration and operational parameters associated therewith. Models further provide an Application Programming Interface (API) to external services and devices for control of the networking equipment. The value of models is it enables openness between vendors and service providers. For example, through models, service providers or the like can develop their own software platforms for network management and control. The conventional approach typically allows one hierarchy or set of relationships to be defined in the model itself. This can be done explicitly in the model by having elements that refer to each other, or it can be done implicitly by having the consumer know the relationships in advance.

The most basic approach to modeling will group attributes into independent objects and these objects will all be addressable from the root of the model in the same way. This is referred to as a flat model. There is no representation of the relationships between the objects or tables in the model itself. In a hierarchical model, the model itself is captured in a language or format that allows nesting of objects, containers, and lists in the model itself. An element may contain children, and the children can have a maximum of one parent. The network model extends the concepts of the hierarchical model, but generalizes the relationships to a general graph or network. This allows children to have more than one parent, and allows cycles to exist in the hierarchy. The relational model uses shared key information to express relationships between flat tables. This allows for more flexible descriptions of the relationships, but it does not allow multiple hierarchies to be defined.

Additional ways to represent hierarchies that are not represented in the model itself can be used but none are generic enough to be dynamic and extensible to any native model. There is no known way to join and reassemble components from existing models in new hierarchies where the root of the hierarchy is at a scope outside of the original intent. Model-defined hierarchies must know a priori what hierarchies need to be represented. They also need the relationships to be encoded in the model itself. In these scenarios, there is no mechanism to have multiple types of relationships defined at the same time since the model itself must contain the relationships. If it is desired to express different relationships at the same time, or different relationships that can change during the course of a lifecycle, the relationships must be able to be expressed outside of the model itself.

BRIEF SUMMARY OF THE DISCLOSURE

In an embodiment, a processor-implemented method implemented to model devices in a network utilizing an assembly providing an arbitrary model includes utilizing one or more first models to represent relationships between devices in the network for control and management thereof, wherein the one or more first models are implemented in an associated database of one or more databases each with an associated schema; defining an assembly to implement the arbitrary model different from the first model, wherein the assembly includes pointers to data instances in the one or more databases; and utilizing the arbitrary model for control and management of the devices in the network, wherein the control and management via the arbitrary model updates the data instances in the one or more databases representing the first model. The one or more databases can include a plurality of databases. The plurality of databases can include a database associated with a shelf, a database associated with a circuit pack, and a database associated with the network. Each of the one or more first models in the plurality of databases can have an associated root level, and wherein the assembly can include a root level above the associated root level from one or more of the one or more first models. The plurality of databases can have common names which are not unique, and wherein the assembly can utilize keys which are unique. The assembly can include a flat list of objects which point to the associated data instances and to children. The one or more first models can include flat models and the arbitrary model can include a hierarchical model.

In another embodiment, an apparatus configured to model devices in a network utilizing an assembly providing an arbitrary model includes a processor; and memory storing instructions that, when executed, cause the processor to utilize one or more first models to represent relationships between devices in the network for control and management thereof, wherein the one or more first models are implemented in an associated database of one or more databases each with an associated schema, define an assembly to implement the arbitrary model different from the first model, wherein the assembly includes pointers to data instances in the one or more databases, and utilize the arbitrary model for control and management of the devices in the network, wherein the control and management via the arbitrary model updates the data instances in the one or more databases representing the first model. The one or more databases can include a plurality of databases. The plurality of databases can include a database associated with a shelf, a database associated with a circuit pack, and a database associated with the network. Each of the one or more first models in the plurality of databases can have an associated root level, and wherein the assembly can include a root level above the associated root level from one or more of the one or more first models. The plurality of databases can have common names which are not unique, and wherein the assembly utilizes keys which are unique. The assembly can include a flat list of objects which point to the associated data instances and to children. The one or more first models can include flat models and the arbitrary model can include a hierarchical model.

In a further embodiment, a non-transitory computer-readable medium includes instructions that, when executed, cause a processor to perform the steps of: utilizing one or more first models to represent relationships between devices in the network for control and management thereof, wherein the one or more first models are implemented in an associated database of one or more databases each with an associated schema; defining an assembly to implement the arbitrary model different from the first model, wherein the assembly includes pointers to data instances in the one or more databases; and utilizing the arbitrary model for control and management of the devices in the network, wherein the control and management via the arbitrary model updates the data instances in the one or more databases representing the first model. The one or more databases can include a plurality of databases. The plurality of databases can include a database associated with a shelf, a database associated with a circuit pack, and a database associated with the network. Each of the one or more first models in the plurality of databases can have an associated root level, and wherein the assembly can include a root level above the associated root level from one or more of the one or more first models. The plurality of databases can have common names which are not unique, and wherein the assembly can utilize keys which are unique. The assembly can include a flat list of objects which point to the associated data instances and to children.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

The present disclosure relates to systems and methods for representing models of network equipment through assemblies which allow multiple original models to be joined together without redefining the original model. Again, in the modeling of a network element, there are limitations on how best to represent the relationships between objects and elements within the model. The systems and methods provide an arbitrary (not owned by an implementer) model that can have multiple, dynamic ways of representing relationships between the elements of the model. Advantageously, the systems and methods provide an ability to refer to elements of a native model in many different ways and recompose hierarchies into dynamic assemblies relevant to different areas. The systems and methods allow models to be joined together in ways that the original models could not have anticipated and in ways which would not be possible without redefining the original model in a new and static way. This allows many generic representations of hierarchies that normally must be explicitly modeled in a static way and have glueware code written to support translations and transformations. The systems and methods can be applied to many use cases to efficiently model relationships between elements in many databases. It will be very useful in a service-based architecture where resource adaptation between components means that data from many databases need to be brought together and represented in new ways best suited for a given service. Advantageously, the assembly approach described herein enables varying implementations on a device without modifying existing schemas and at runtime without having to compile a new model. The assembly provides a mechanism to rearrange and reuse existing database and schema to provide an arbitrary model.

By defining a generic assembly model, any hierarchy can be constructed in the assembly, and data instances from different sources can be combined into a single hierarchy. The assembly is constructed of pointers to data instances in multiple native databases with a set of child components at each layer of the component to represent the element ancestry. There are benefits to modeling the assembly as a hierarchy as opposed to a flat model of elements with pointers since it allows the names of the elements to be derived directly from the source models since the source database is represented by the keys of its ancestors, rather than having ancestry data imposed in the key itself (which would force key redefinition).

It is also important that the data in the native model itself is not represented in the assembly, but that the assembly point to the data contents. This allows multiple assemblies to come and go dynamically defined at run-time without affecting the operation of the base database. It is also a feature that the rules describing what can be assembled in an assembly be defined in data models to allow it to be apparent what valid rules exist. Examples of rules that may be needed can include modules that can be included in the assembly mount point, recursion depth if an assembly can contain itself, tree depth of the target, filter of the target (to prune contents of the mounted dataset), etc. It is also a feature that references to data instances can be indexed in the assembly so a data instance in the native model can query the assembly by identity and determine what assemblies reference the instance.

There may be cases where an interface cannot be extended to understand how to process pointers since it only knows how to consume static data models where the hierarchy is unambiguous. In cases such as this, preprocessing can be done to construct static models that can be used by these interfaces. This static "unfolding" of the new hierarchy does not have all the advantages of the dynamic model but may be required for compatibility and static documentation. This "unfolding" would use the rules defined for the assembly to restrict the assembly's contents.

The assembly described herein is designed to support multiple sets of relationships, support data from multiple sources which were not designed with name uniqueness in mind, define/overlay relationships between elements in a model not designed for those relationships, support hierarchies within hierarchies (allow root level objects to be children of other elements from other models), combine models which were not intended to be combined, allow assembling both hierarchical and flat models in any combination, allow rules to be defined which can dynamically determine valid assemblies, and the like. By using assemblies, the relationships can be data-driven, and there can be multiple types of relationships that can be captured and accessed without redefining containment hierarchies. When models are remodeled to allow a higher level containment (devices in a network), additional information needs to be added to the higher level model to ensure keys and instances do not collide when the data from multiple databases are brought together.

Of note, this mechanism provides the best of both worlds such that an external client which has knowledge of the hierarchy can take advantage of the increased granularity of "addressability", but on the flip side, a simple client could just treat the paths as "opaque" and see the network as flat.

If the scoping of domains changes dynamically, the client doesn't necessarily need to know. A directory service would just give it a new "opaque" path and it happily continues to operate on the same instance.

As described herein, the data model (which may also be referred to as an object model, information model, etc.) includes computer data in a specified structure. The computer data is used to maintain and manage configurations of a network and associated devices, and to program and configure the physical hardware associated with the network. The computer data is further used by management systems (e.g., controller on a network element, a control plane, Software Defined Networking (SDN) controller, Network Management System (NMS), Element Management System (EMS), etc.) for performing various Operations, Administration, Maintenance, and Provisioning (OAM&P) functions. An aspect of the data model is to enable management interoperability between disparate vendors, etc. By introducing the concept of technology-independent management, it is possible to perform management of diverse equipment using common communication interfaces. In this manner, a high-level view over a set of network elements can be achieved. An example of a model is described in ITU-T Recommendation M.3100 "Generic network information model," (04/05), the contents of which are incorporated by reference. Another example of a model is described in the Open Networking Foundation (ONF) Core Information Model (CoreModel) TR-512.A.4 Appendix—Analogue and Media Examples (Layer 0), Version 1.3, September 2017, the contents of which are incorporated by reference.

Example Network Element

Figure 1:
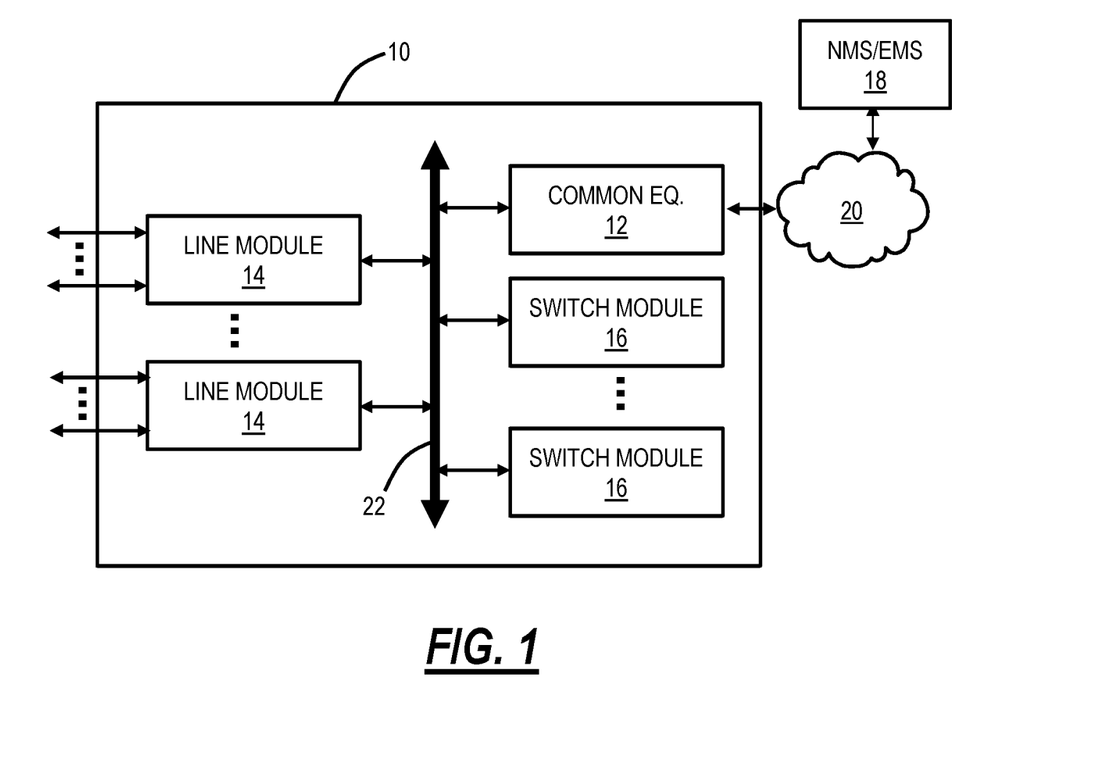
FIG. 1 is a block diagram of an example network element for use with the systems and methods described herein.

FIG. 1 is a block diagram of an example network element 10 for use with the systems and methods described herein. The network element 10 may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 10 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the network element 10 can be any digital and/or optical system with ingress and egress digital and/or optical signals and switching of channels, timeslots, tributary units, etc. While the network element 10 is generally shown as an optical network element, the systems and methods contemplated for use with any physical networking, storage, or compute node, hardware, components, etc.

The network element 10 can include common equipment 12, one or more line modules 14, and one or more switch modules 16. The common equipment 12 can include power; a control module; OAM&P access; user interface ports; and the like. The common equipment 12 can connect to a management system 18 through a Data Communication Network (DCN) 20 (as well as a Path Computation Element (PCE), SDN controller, OpenFlow controller, etc.). The management system 18 can include an NMS, EMS, or the like. Additionally, the common equipment 12 can include a control plane processor, such as a controller 30 illustrated in FIG. 2 configured to operate a control plane, to perform OAM&P functions for the network element 10, and to realize various aspects of the models. The network element 10 can include an interface 22 for communicatively coupling the common equipment 12, the line modules 14, and the switch modules 16 to one another. For example, the interface 22 can be a backplane, midplane, a bus, optical or electrical connectors, or the like. The line modules 14 are configured to provide ingress and egress to the switch modules 16 and to external connections on the links to/from the network element 10. In an embodiment, the line modules 14 can form ingress and egress switches with the switch modules 16 as center stage switches for a three-stage switch, e.g., a three-stage Clos switch. Other configurations and/or architectures are also contemplated. The line modules 14 can include optical transceivers at various rates such as, for example, 10 Gb/s, 40 Gb/s, 100 Gb/s, etc.

Further, the line modules 14 can include a plurality of optical connections per module and each module may include flexible rate support for any type of connection. The line modules 14 can include wavelength division multiplexing interfaces, short reach interfaces, and the like, and can connect to other line modules 14 on remote network elements, end clients, edge routers, and the like, e.g., forming connections on the links in a network. From a logical perspective, the line modules 14 provide ingress and egress ports to the network element 10, and each line module 14 can include one or more physical ports. The switch modules 16 are configured to switch channels, timeslots, tributary units, packets, wavelengths, etc. between the line modules 14. For example, the switch modules 16 can provide wavelength granularity (Layer 0 switching); OTN granularity; Ethernet granularity; and the like. Specifically, the switch modules 16 can include Time Division Multiplexed (TDM) (i.e., circuit switching) and/or packet switching engines. Also, the switch modules 16 can provide only optical switching, e.g., Wavelength Selective Switches (WSS).

Those of ordinary skill in the art will recognize the network element 10 can include other components which are omitted for illustration purposes, and that the systems and methods described herein are contemplated for use with a plurality of different network elements with the network element 10 presented as an example type of network element. For example, in another embodiment, the network element 10 may not include the switch modules 16, but rather have the corresponding functionality in the line modules 14 (or some equivalent) in a distributed fashion, or omit the functionality altogether. For the network element 10, other architectures providing ingress, egress, and switching are also contemplated for the systems and methods described herein. In general, the systems and methods described herein contemplate use with any network element providing switching of channels, timeslots, tributary units, wavelengths, etc.

Example Controller

Figure 2:
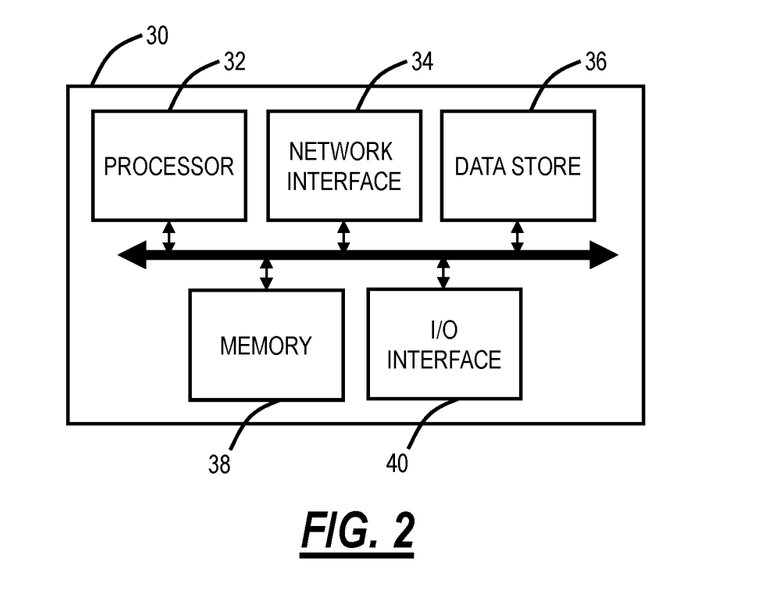
FIG. 2 is a block diagram of a controller to provide Operations, Administration, Maintenance, and Provisioning (OAM&P) for the network element, and/or to implement a Software Defined Networking (SDN) controller.

FIG. 2 is a block diagram of a controller 30 to provide operations, administration, maintenance, and provisioning (OAM&P) for the network element 10, and/or to implement a Software Defined Networking (SDN) controller. The controller 30 can be part of the common equipment, such as common equipment 12 in the network element 10, or a stand-alone device communicatively coupled to the network element 10 via the DCN 20. In a stand-alone configuration, the controller 30 can be an SDN controller, an NMS, a PCE, etc. The controller 30 can include a processor 32 which is a hardware device for executing software instructions such as operating the control plane. The processor 32 can be any custom made or commercially available processor, a central processing unit (CPU), an auxiliary processor among several processors associated with the controller 30, a semiconductor-based microprocessor (in the form of a microchip or chip set), or generally any device for executing software instructions. When the controller 30 is in operation, the processor 32 is configured to execute software stored within the memory, to communicate data to and from the memory, and to generally control operations of the controller 30 pursuant to the software instructions. The controller 30 can also include a network interface 34, a data store 36, memory 38, an I/O interface 40, and the like, all of which are communicatively coupled to one another and to the processor 32.

The network interface 34 can be used to enable the controller 30 to communicate on the DCN 20, such as to communicate control plane information to other controllers, to the management system 18, to the network elements 10, and the like. The data store 16 can be used to store data, such as control plane information, provisioning data, OAM&P data, etc. The data store 36 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 36 can incorporate electronic, magnetic, optical, and/or other types of storage media. The memory 38 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 38 may incorporate electronic, magnetic, optical, and/or other types of storage media. The I/O interface 40 includes components for the controller 30 to communicate with other devices. Further, the I/O interface 40 includes components for the controller 30 to communicate with the other network elements 10, such as using overhead associated with OTN signals.

Network Element Model

Again, in the modeling of the network element 10, there are limitations on how best to represent the relationships between objects and elements within the model. A flat model is a model in which no relationships are modeled explicitly, and must be known externally, or inferred from a specific implementation or design. A fully hierarchical model is a model in which the relationships between elements are modeled by the hierarchy of the model itself. Parents can contain children, and children can have a single parent.

While this may be sufficient for most types of relationships, there are drawbacks to the hierarchical model. Firstly, the model must be owned and controlled by a single implementer to reflect these relationships in the model itself. Secondly, there is typically only one set of relationships that can be represented in each model. Thirdly, since the model itself is static, it is difficult to represent relationships that can change during the lifetime of the system.

The systems and methods include a flat and arbitrary (not owned by an implementer or the model) model that can have multiple, dynamic ways of representing relationships between the elements of the model (or another model). In this manner, an equipment manufacturer can provide equipment models that conform to individual customer's desired models.

Again, optical networking elements need to be modeled for users to address, find, and refer to the components of the device. As described herein, the device can be the network element 10, individual modules in the network element 10 such as the common equipment 12, the line modules 14, and/or the switch modules 16, and the like. Further, the model can include services, configurations, etc. associated with the devices. Modeling may be done at the interface layer (defining what operations can be performed on the device and against what resources the operations can be performed). Modeling may also be done at the object layer, where an object contains a set of attributes or leaves that assume normal database-style operations as a default set of operations that can be performed (i.e.: Create, Retrieve, Update, Delete, or "CRUD"). Independent to the CRUD operations, a set of actions or procedures can be modeled which extend the set of operations for actions which do not correspond to database-like actions.

The most basic approach to modeling will group attributes into independent objects and these objects will all be addressable from the root of the model in the same way. This is referred to as a flat model. There is no representation of the relationships between the objects or tables in the model itself. In a hierarchical model, the model itself is captured in a language or format that allows nesting of objects, containers, and lists in the model itself. An element may contain children, and the children can have a maximum of one parent. The network model extends the concepts of the hierarchical model, but generalizes the relationships to a general graph or network. This allows children to have more than one parent, and allows cycles to exist in the hierarchy. The relational model uses shared key information to express relationships between flat tables. This allows for more flexible descriptions of the relationships, but it does not allow multiple hierarchies to be defined.

Modeling Relationships

Modeling languages have primitives and approaches to representing the relationships defined in the model itself. In a flat model, there is nothing in the model itself that describes the relationships between objects. The implementation must be constructed to represent and assemble the object relationships as needed. A flat database is a set of independent tables with each row (record) providing values for the columns (fields) in an instance. As such, the model itself is simply a set of attributes with no hierarchy.

In a hierarchical model, the modeling language can allow for elements to contain other elements. This is how parent/child relationships are modeled. In YANG (Yet Another Next Generation) modeling, for example, a container or list can contain other containers and lists, and this represents the relationships in the model. YANG is a data modeling language for the definition of data sent over the NETCONF network configuration protocol. The YANG data modeling language was developed in the Internet Engineering Task Force (IETF) and was published as RFC 6020 in October 2010, the contents of which are incorporated herein by reference. The data modeling language can be used to model both configuration data as well as state data of network elements. Furthermore, YANG can be used to define the format of event notifications emitted by network elements and it allows data modelers to define the signature of remote procedure calls that can be invoked on network elements via the NETCONF protocol. The language, being protocol independent, can then be converted into any encoding format, e.g., Extensible Markup Language (XML) or JavaScript Object Notation (JSON), that the network configuration protocol supports.

In a network model or relational model, the many-to-many relationships are encoded in the model by constructing keys that are shared between multiple flat tables. An associative table (junction table, pivot table) contains keys from multiple associated tables and the relationships are described in this manner. In these scenarios, there is no mechanism to have multiple types of relationships defined at the same time since the model itself must contain the relationships. If it is desired to express different relationships at the same time, or different relationships that can change during the course of a lifecycle, the relationships must be able to be expressed outside of the model itself.

Relationships can be modeled via common elements. If two records in different parts of the model are aware of a common element's name, and that common element share relatable content that indicates they are related, this can indicate the records share a relationship.

The foregoing examples describe networking equipment based on chassis, slot, state, port, power, etc. A chassis is a shelf for the network element 10 which can include various slots which support modules (e.g., the common equipment 12, the line modules 14, the switch modules 16, etc.). A port represents a physical interface in the network element 10, such as an Ethernet port, an optical interface, etc. Note, the port can be protocol-specific (e.g., 100 Gigabit Ethernet (GbE), etc.). Power can be an attribute for each slot, port, etc., e.g., power in Watts used. The state can be REMOVED, PRESENT indicating whether a slot is occupied.

| Slot | State |
| --- | --- |
| 1 | Removed |
| 2 | Present |
| 3 | Removed |

| Port | Slot | Power |
| --- | --- | --- |
| 1-1 | 1 | 2.2 |
| 1-2 | 1 | 3.3 |
| 2-1 | 2 | 4.4 |

The relatable content can be an exact match between field names in different records ("Slot" in the example above), for example:

| Slot | State |
| --- | --- |
| 1 | Removed |
| 2 | Present |
| 3 | Removed |

| Port | Parent-Slot | Power |
| --- | --- | --- |
| 1-1 | 1 | 2.2 |
| 1-2 | 1 | 3.3 |
| 2-1 | 2 | 4.4 |

The relatable content can have associated field names in different records, where this relationship is captured in the model, or implicit in the model or a rule. In the example above, there could be a rule that any field that starts with "Parent-" indicates a relationship to another record. The rule can also be implied by design, where consumers implicitly know the fields that relate these records, or the rule can be specified in metadata within the model itself, or in data nodes in the model.

The drawback of this approach is that the tables themselves are still implicitly defined in the model. It is understood in these models that ports are children of slots and there is no other relationship that can be supported.

This type of model is also supported in the YANG modeling language as a leaf-reference or a key-reference. This enforces a strict reference to the element with the use of a path specifier to identify a specific element in the target record via a path specification. This is useful in hierarchical models to identify shared relationships. However, when the referenced object is in a hierarchy that contains multiple keys to guarantee uniqueness, a single pointer to the record is not enough. A reference needs to exist for every key in the target hierarchy.

| Chassis | Slot | State | Port | Parent-Chassis | Parent-Slot | Power |
| --- | --- | --- | --- | --- | --- | --- |
| 1 | 1 | Removed | 1-1-1 | 1 | 1 | 2.2 |
|  | 2 | Present | 1-1-2 | 1 | 1 | 3.3 |
| 2 | 1 | Removed | 1-2-1 | 1 | 2 | 4.4 |
|  |  |  | 2-1-1 | 2 | 1 | 5.5 |
|  |  |  | 2-1-2 | 2 | 2 | 6.6 |

This further complicates models if the target element can exist at multiple levels in the hierarchy, some of which require more keys than others:

| Chassis | Slot | State |
| --- | --- | --- |
| 1 | 1 | Removed |
|  | 2 | Present |
| 2 | 1 | Removed |

| Slot | |
| --- | --- |
| 1 | Removed |

| Port | Parent-Chassis | Parent-Slot | Power |
| --- | --- | --- | --- |
| 1-1-1 | 1 | 1 | 2.2 |
| 1-1-2 | 1 | 1 | 3.3 |
| 1-2-1 | 1 | 2 | 4.4 |
| 2-1-1 | 2 | 1 | 5.5 |
| 2-1-2 | 2 | 2 | 6.6 |
| 1-1 |  | 1 | 7.7 |

In order to address this flexibility, an instance-identifier can be used to arbitrarily point to any record in the model. This is represented in YANG as a path which contains all elements and keys to uniquely identify the target:

| Chassis | Slot | State |
| --- | --- | --- |
| 1 | 1 | Removed |
|  | 2 | Present |
| 2 | 1 | Removed |
| Slot | | |
| 1 | | Removed |

| Port | Parent | Power |
| --- | --- | --- |
| 1-1-1 | /chassis[1]/slot[1] | 2.2 |
| 1-1-2 | /chassis[1]/slot[1] | 3.3 |
| 1-2-1 | /chassis[1]/slot[2] | 4.4 |
| 2-1-1 | /chassis[2]/slot[1] | 5.5 |
| 2-1-2 | /chassis[1]/slot[1] | 6.6 |
| 1-1 | /slot[1] | 7.7 |

The drawback of this approach is that it can only define relationships in a single way, one that is captured in the model itself.

Another point to note in this example is that the port keys as defined must be unique within the context of the database. This is an example where the model is partially flat and partially hierarchical. Hierarchical parts of the model do not need to worry about the uniqueness of names since the hierarchy provides the needed containment to guarantee uniqueness.

However, a hierarchical model may have the same object represented at many different layers, which makes it difficult to model and query similar objects in bulk. Moving to a flat model can alleviate this, but then the keys for the flattened model must be unique. In many cases, they are made unique by constructing keys that contain a hierarchy within them.

Also note that in a given hierarchical model, there is no way to refer to an element that has been defined at the root level at any other depth. Something defined at the root cannot be nested within a higher-level hierarchy without remodeling the hierarchy and the components. In a model which contains those relationships within the data nodes themselves, the data nodes must themselves be redefined in a larger hierarchy.

Assemblies

A key aspect of the systems and methods is the concept of an assembly. An assembly is a database/software configuration designed to support multiple sets of relationships, support data from multiple sources which were not designed with name uniqueness in mind, define/overlay relationships between elements in a model not designed for those relationships, support hierarchies within hierarchies (allow root level objects to be children of other elements from other models), combine models which were not intended to be combined, allow constructing both hierarchical and flat models in any combination, and allow rules to be defined which can dynamically determine valid assemblies.

Use Cases for Assemblies

Figure 3:
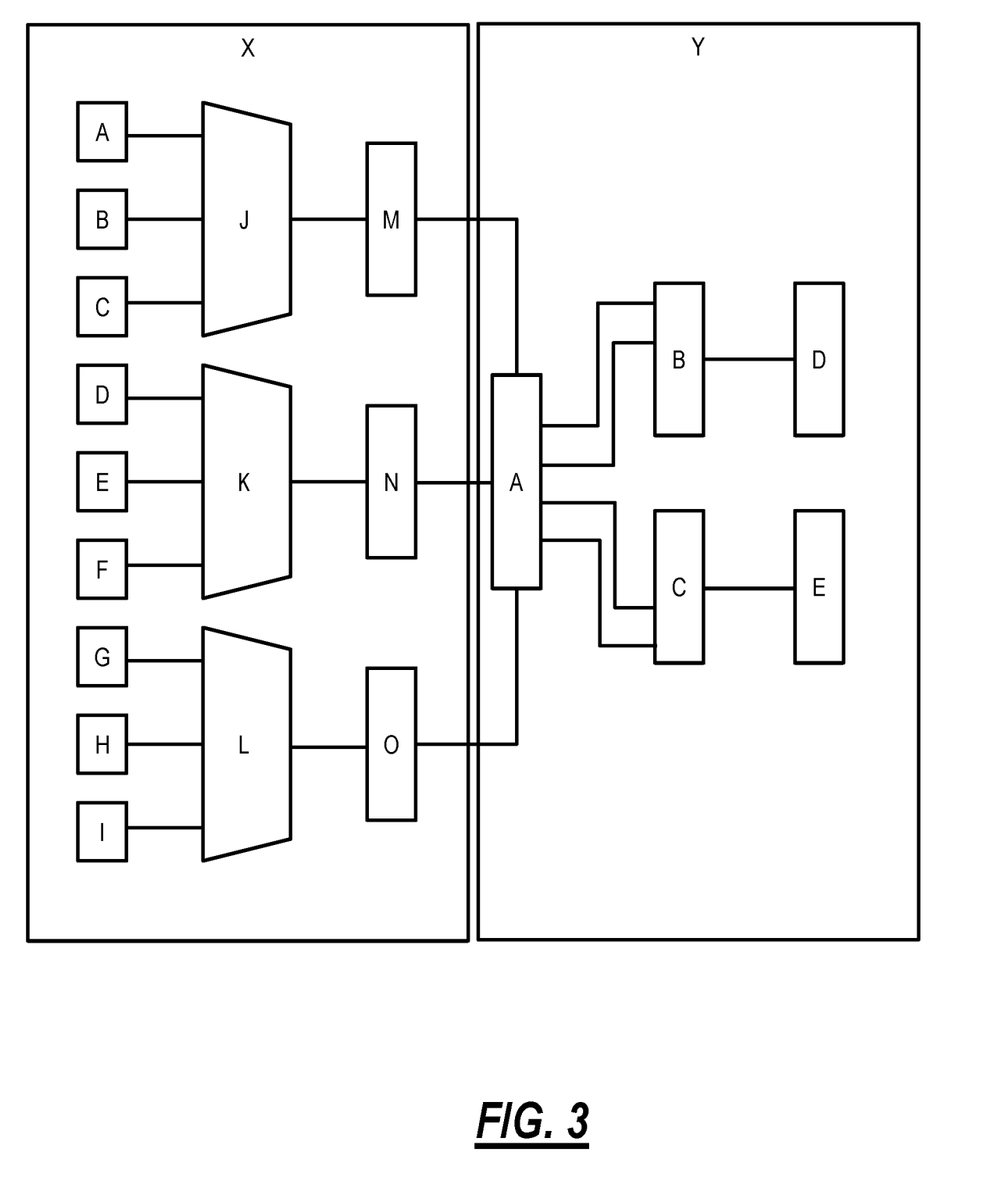
FIG. 3 is a block diagram of equipment in two shelves X, Y associated with one or more network element.

The following describes examples of types of relationships in the network element 10 that can be constructed and coexist with one another. FIG. 3 is a block diagram of equipment in two shelves X, Y associated with one or more network element 10. Specifically, the equipment can be circuit packs, modules, blades, etc. For illustration purposes, the equipment is referred to herein as circuit packs A-O in this example each in shelves X, Y.

For example, the relationships can include a physical containment, a service hierarchy, port trails, and logical control blocks. The physical containment models the actual physical hardware based on location, e.g., circuit packs in a shelf in a network element, ports on the circuit packs, etc. The service hierarchy describes signals over a network, e.g., a port having an Optical Channel (OCH) which carries an Optical Transport Unit (OTU) which has an Optical Data Unit (ODU), etc. The port trails describe an optical service flow over multiple components in an optical network, e.g., a service is over Port A-1 which connects to Port J-1, etc. in shelf X and then is over Port A-1 which connects to Port B-1, etc. in shelf Y. The logical control blocks model a logical assembly of the controllable components within a device.

Each of these models has different characteristics and relationships and it is impractical to define a single, static, vendor-controlled model which covers all permutations. To that end, the systems and methods provide an assembly which takes different models and allows for different groupings. For example, assume there is a physical containment model which models the hardware. A port trail assembly can be used to define the port trails in the physical containment model without having to include that support in the physical containment model.

Physical Containment Assembly

The most typical assembly that can exist in an optical network element 10 is the physical containment hierarchy. The hardware that controls the optical network element 10 includes devices that are assembled onto a board, and that board is inserted into a module (circuit pack), and the module is inserted into a chassis (shelf), and multiple chassis can be designed to work together as a complete network element 10 that supports the complete optical device.

This physical containment assembly is important since it represents the components within the device that are contained within each physical piece of field-replaceable hardware. When new hardware is provisioned, the physical containment assembly describes what software objects need to be constructed in order to manage that hardware. When a fault occurs on a particular device, this assembly can describe the other components in the device that are affected by that fault. When the configuration is applied to, or operational data is requested from a component within the device, this assembly is used to determine where to send the message related to the operation.

The flexibility of hardware design allows for many ways to package components and model them in software. If this hierarchy is to be modeled in a hierarchical model, it can be cumbersome to model all the different ways that hardware can be contained within itself (bay (frame, rack, etc.), shelf (chassis), subshelf, slot, subslot, module (circuit pack), pluggable port, ribbon cable, simplex cable, etc.).

In the example of FIG. 3, the optical device can be a DWDM network element 10. The circuit packs A-I can be optical modules (e.g., line cards, pluggable modules, etc.) having ports. In the shelf X, the circuit packs J-L can be optical multiplexers which combine the ports from the circuit packs A-I, and the circuit packs M, N, O can be amplifiers or the like. In the shelf Y, the circuit pack A can be a switch such as a Wavelength Selective Switch (WSS), and the circuit packs B-D can be components on different degrees of the WSS such as amplifiers, attenuators, Optical Channel Monitors (OCMs), etc.

A physical containment assembly can be as follows:
Shelf X
  Circuit Pack A
    Port A-1
  Circuit Pack B
    Port B-1
  Circuit Pack C
    Port C-1
  Circuit Pack D
    Port D-1
  Circuit Pack E
    Port E-1
  Circuit Pack F
    Port F-1
  Circuit Pack G
    Port G-1
  Circuit Pack H
    Port H-1
  Circuit Pack I
    Port I-1
  Circuit Pack J
    Port J-1
    Port J-2
    Port J-3
    Port J-4
  Circuit Pack K
    Port K-1
    Port K-2
    Port K-3
    Port K-4
  Circuit Pack L
    Port L-1
    Port L-2
    Port L-3
    Port L-4
  Circuit Pack M
    Port M-1

Port M-2
  Circuit Pack N
    Port N-1
    Port N-2
  Circuit Pack O
    Port O-1
    Port O-2
  Shelf Y
  Circuit Pack A
    Port A-1
    Port A-2
    Port A-3
    Port A-4
    Port A-5
    Port A-6
    Port A-7
  Circuit Pack B
    Port B-1
    Port B-2
    Port B-3
  Circuit Pack C
    Port C-1
    Port C-2
    Port C-3
  Circuit Pack D
    Port D-1
    Port D-2
  Circuit Pack E
    Port E-1
    Port E-2
Service Hierarchy Assembly When services are provisioned that flow across the optical device, the signals that support that service are normally mapped and encapsulated in a hierarchy. The OTN model is one such description of a signal containment assembly. These layers all share common attributes and, in many cases, can be modeled by the same software objects due to their common design. It is difficult to model this hierarchy in a modeling language due to the flexibility of the mappings that can occur. One type of signal mapping can exist at multiple layers in the hierarchy and can include one or many different kinds of other signals. Any hierarchical model that intends to reflect this reality needs to be constructed in advance and have the foresight to model all future combinations of signal encapsulation, or risk needed to extend support for the model in the future.

For example, one example service hierarchy assembly in OTN is as follows, using Port A-1 from the physical containment assembly:

Port A-1
    OCH (Optical Channel)
      OTU (Optical Transport Unit)
        ODU (Optical Data Unit)
Port Trails When an optical service flows over multiple components within a device, the control and service/fault correlation software components may need to be able to query data about the physical ports that the service traverses without needing to know the actual structure. For example, a port trails assembly can include:

Service A
    Shelf X
      Port A-1
      Port J-1
      Port J-4
      Port M-1
      Port M-2
    Shelf Y
      Port A-1
      Port A-4
      Port B-1
      Port B-3
      Port D-1
      Port D-2
Logical Control Blocks Control applications and generic monitoring services in a (optical) network may be interested in the logical assembly of the controllable components within a device. While the physical containment is important for fault isolation and directing messages to the correct destination, the logical assembly of the control blocks can provide an abstract model of the device that is not dependent on the underlying physical construction of the device. For example, a logical control block can include:

Degree 1
    Line Port
      Shelf Y
        Port D-2
    Access Ports
      Shelf Y
        Port B-1
        Port B-2
  Degree 2
    Line Port
      Shelf Y
        Port E-2
    Access Ports
      Shelf Y
        Port C-1
        Port C-2
    Access group 1
      Line Port
        Shelf X
          Port M-2
      Access Ports
        Shelf X
          Port J-1
          Port J-2
          Port J-3
    Access group 2
      Line Port
        Shelf X
          Port N-2
      Access Ports
        Shelf X
          Port K-1
          Port K-2
          Port K-3
    Access group 3
      Line Port
        Shelf X
          Port O-2
      Access Ports
        Shelf X
          Port L-1
          Port L-2
          Port L-3
  Nodal Cross Connect
    Line Ports
      Shelf Y
        Port D-2
        Port E-2
    Access Ports
      Shelf X Port J-1
Port J-2
Port J-3
Port K-1
Port K-2
Port K-3
Port L-1
Port L-2
Port L-3

Administrative Groupings

Along these lines, a more generalized case can include an arbitrary administrative grouping. For example, a user wanting to define "domains" for their own relevant reasons e.g., geographically (municipal, provincial, regional, etc.) or organizational (Division A vs Division B, etc.). The assembly concept enables the ability to model these arbitrary domains and react "on the fly" to user provisioning changes that redefine these domains.

Network Models and Clustering

When a model is defined hierarchically, there is typically a root element in the hierarchy. It may be advantageous to be able to represent multiple devices in a higher layer model that can 'mount' the tree of the device model as a 'branch' on another model, which is supported by the assembly.

One example of this may be a clustering model, in which a device modeled as a removable component can have its hierarchy grouped with other peer devices. For example, a shelf can contain multiple circuit packs within it. If the circuit pack models are designed hierarchically with the circuit packs itself as the highest ancestor in the tree, there may be no easy way to model a shelf above that circuit pack at the shelf level without having the remodel the entire circuit pack below it.

Another example may be a network model in which multiple devices can be managed at the same time. Normally the device model would be at the higher layer of a hierarchy and if a management system exists at a higher layer than the device, the network model would need to be remodeled with the device contents remapped within the network model.

The use of an assembly in these cases can assist by decoupling the object relationships from the model itself and allowing elements that are normally only at the root of the hierarchy to be mapped to lower layers without defining the model itself. For example:

Cluster
Shelf 1
Shelf 2

Security Models

Access control mechanisms modeled in normal modeling languages allow for statically defined user groups associated with leaves or fields at any layer in a hierarchy. When the same data is represented in different ways and different hierarchies, it is necessary to manually align the security models from one model's representation to another.

By representing an access control group as an assembly which refers to a base representation, as opposed to copying it, the groups for access control can be modified at runtime and represented in a parallel model.

Creating and Maintaining Assemblies

In order to represent multiple sets of relationships between and within multiple models, the relationships need to be defined separately from the data in the assembly. Conventionally, the data is replicated in the process of defining these relationships. However, the assembly is composed of pointers to instances of data in existing models, avoiding this replication.

In the simplest case, an assembly can be modeled within the same domain as the database it is pointing to. In this way, it can be ensured that every instance the assembly points to is uniquely named within the database of interest. As discussed herein, an instance-identifier is the most generic way to refer to an instance in the native database.

Figure 4:
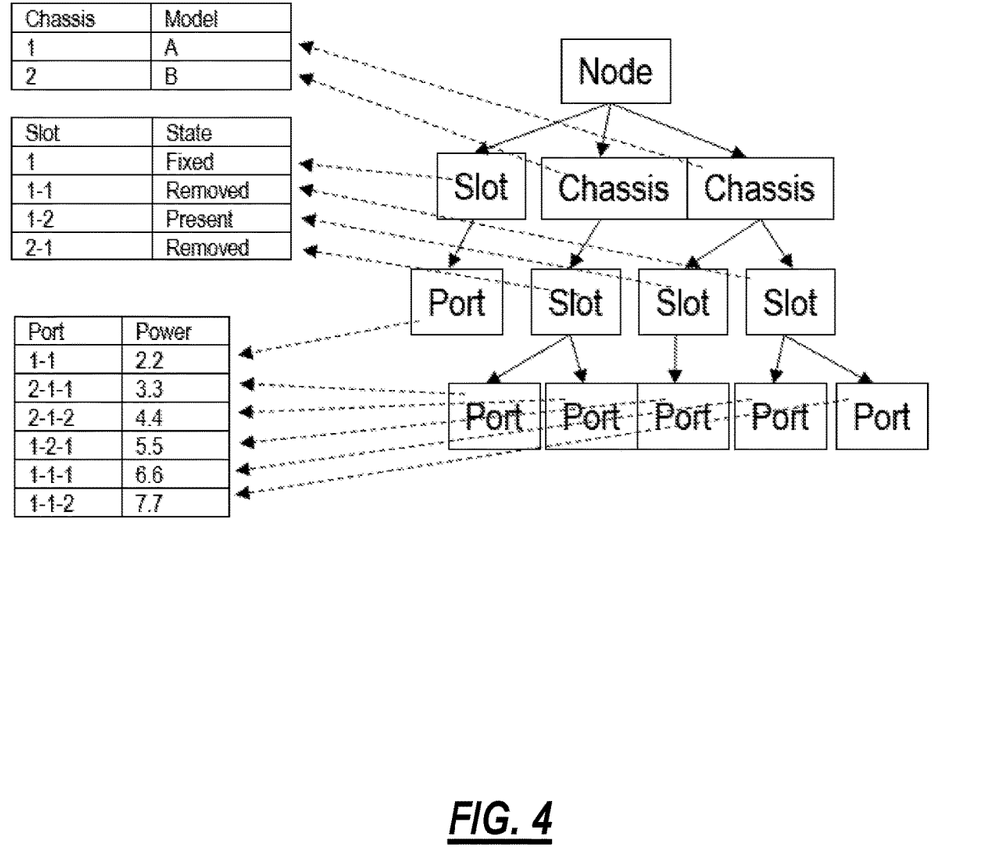
FIG. 4 is a diagram of an assembly modeled in the same database.

FIG. 4 is a diagram of an assembly modeled in the same database. The following lists the instance-identifier for the assemblies in FIG. 4.

| Assembly | instance-identifier |
|---|---|
| node | |
| node/chassis[1] | /chassis[1] |
| node/chassis[2] | /chassis[2] |
| node/slot[1] | /slot[1] |
| node/slot[1]/port[1-1] | /port[1-1] |
| node/chassis[1]/slot[1-1] | /slot[1-1] |
| node/chassis[1]/slot[1-1]/port[1-1-1] | /port[1-1-1] |
| node/chassis[1]/slot[1-1]/port[1-1-2] | /port[1-1-2] |
| node/chassis[1]/slot[1-2] | /slot[1-2] |
| node/chassis[1]/slot[1-2]/port[1-2-1] | /port[1-2-1] |
| node/chassis[2]/slot[2-1] | /slot[2-1] |
| node/chassis[2]/slot[2-1]/port[2-1-1] | /port[2-1-1] |
| node/chassis[2]/slot[2-1]/port[2-1-2] | /port[2-1-2] |

As described herein, it can be seen that there are some cases where the assembly needs to construct a hierarchy that does not exist in the original model. There may also be cases where the original model contains a hierarchy that is not referenced or included in the assembly.

Since the assembly constructs arbitrary hierarchies based on arbitrary models, the assembly provides both the ability to construct and constrain hierarchies in the native models. There may also be cases where the original hierarchy is intended to be preserved in the assembly, and that references to both the assembly hierarchy and the native hierarchy can be supported at the same time.

In order to construct hierarchies in the assembly, the assembly employs a way to not only point to elements in the native database but also to point to other related elements in the assembly. The assembly is also configured to point to other assemblies to avoid duplication and provide encapsulation.

In a more complex case, assemblies can contain data from domains outside of the assembly's domain. This may be an example in clustering, where a top-level cluster manager can model and manage the data for multiple devices below it. The names of the elements in each database do not need to be unique in their own context but must be unique in the assembly. It is not enough to simply merge the data from multiple domains into one database at the assembly level, as the keys in the databases may collide. There must then, be a way in the assembly definition to refer to multiple databases and provide pointers to instances of data in each database.

For example, here is an example of an assembly spanning multiple databases:

| Database | Chassis | Model |
|---|---|---|
| 1 | | A |
| 2 | | B |

| Database | Slot | State |
|---|---|---|
| 3 | | Fixed |
| 1 | 1 | Removed |

-continued

| | | |
|---|---|---|
| 1 | 2 | Present |
| 2 | 1 | Removed |

| Database | Port | Power |
|---|---|---|
| 3 | 1 | 2.2 |
| 2 | 2-1 | 3.3 |
| 2 | 2-2 | 4.4 |
| 1 | 1-1 | 5.5 |
| 1 | 1-1 | 6.6 |
| 1 | 1-2 | 7.7 |

| Assembly | Database | Instance-ID |
|---|---|---|
| node | 4 | |
| node/chassis[1] | 1 | /chassis |
| node/chassis[2] | 2 | /chassis |
| node/slot[1] | 3 | /slot |
| node/slot[1]/port[1] | 3 | /port[1] |
| node/chassis[1]/slot[1] | 1 | /slot[1] |
| node/chassis[1]/slot[1]/port[1] | 1 | /port[1-1] |
| node/chassis[1]/slot[1]/port[2] | 1 | /port[1-2] |
| node/chassis[1]/slot[2] | 1 | /slot[2] |
| node/chassis[1]/slot[2]/port[1] | 1 | /port[2-1] |
| node/chassis[2]/slot[1] | 2 | /slot[1] |
| node/chassis[2]/slot[1]/port[1] | 2 | /port[1-1] |
| node/chassis[2]/slot[1]/port[2] | 2 | /port[1-2] |

The assembly thus far has been shown as a hierarchy in the model. Another approach could be to model the assembly as a flat list of objects that can point to native data instances as well as point to children, such as, for example:

| Database | Chassis | Model |
|---|---|---|
| 1 | | A |
| 2 | | B |

| Database | Slot | State |
|---|---|---|
| 3 | | Fixed |
| 1 | 1 | Removed |
| 1 | 2 | Present |
| 2 | 1 | Removed |

| Database | Port | Power |
|---|---|---|
| 3 | 1 | 2.2 |
| 2 | 2-1 | 3.3 |
| 2 | 2-2 | 4.4 |
| 1 | 1-1 | 5.5 |
| 1 | 1-1 | 6.6 |
| 1 | 1-2 | 7.7 |

| Assembly | instance-id | children |
|---|---|---|
| element[node] | | chassis-1, chassis-2, slot-1 |
| element[chassis-1] | /chassis[1] | slot-1-1, slot-1-2 |
| element[chassis-2] | /chassis[2] | slot-2-1 |
| element[slot-1] | /slot[1] | port-1-1 |
| element[port-1-1] | /port[1-1] | |
| element[slot-1-1] | /slot[1-1] | port-1-1-1, port-1-1-2 |
| element[port-1-1-1] | /port[1-1-1] | |
| element[port-1-1-2] | /port[1-1-2] | |
| element[slot-1-2] | /slot[1-2] | port-1-2-1 |
| element[port-1-2-1] | /port[1-2-1] | |
| element[slot-2-1] | /slot[2-1] | port-2-1-1, port-2-1-2 |
| element[port-2-1-1] | /port[2-1-1] | |
| element[port-2-1-2] | /port[2-1-2] | |

The elements in the assembly must also have proper names that will be unique in the assembly itself. If the names for the elements are directly extracted from the elements they point to, name uniqueness cannot be guaranteed unless the assembly has a hierarchy or naming structure that avoids collisions between elements taken from different databases.

| Database | Chassis | Model |
|---|---|---|
| 1 | | A |
| 2 | | B |

| Database | Slot | State |
|---|---|---|
| 3 | | Fixed |
| 1 | 1 | Removed |
| 1 | 2 | Present |
| 2 | 1 | Removed |

| Database | Port | Power |
|---|---|---|
| 3 | 1 | 2.2 |
| 2 | 2-1 | 3.3 |
| 2 | 2-2 | 4.4 |
| 1 | 1-1 | 5.5 |
| 1 | 1-1 | 6.6 |
| 1 | 1-2 | 7.7 |

| Assembly | DB | instance-id | children |
|---|---|---|---|
| element[node] | 4 | | chassis, chassis, slot |
| element[chassis] | 1 | /chassis | slot-1, slot-2 |
| element[chassis] | 2 | /chassis | slot-1 |
| element[slot] | 3 | /slot | port-1 |
| element[port-1] | 3 | /port[1] | |
| element[slot-1] | 1 | /slot[1] | port-1-1, port-1-2 |
| element[port-1-1] | 1 | /port[1-1] | |
| element[port-1-2] | 1 | /port[1-2] | |
| element[slot-2] | 1 | /slot[2] | port-2-1 |
| element[port-2-1] | 1 | /port[2-1] | |
| element[slot-1] | 2 | /slot[1] | port-1-1, port-1-2 |
| element[port-1-1] | 2 | /port[1-1] | |
| element[port-1-2] | 2 | /port[1-2] | |

Of note, the same port numbers can be pointed to by different elements in the assembly. In order to guarantee uniqueness without forcing a user to intervene and create unique names, the names of the elements can remain the same, but the placement in the hierarchy (under Service and Shelf) can provide enough context to make the assembly element unique within the assembly. If the assembly is not modeled as a hierarchy, this may not be possible, as shown above.

The names in these examples imply that up-front modeling was employed to enforce the assembly hierarchy in a model that contains nodes, chassis, slots, and ports. As can be seen with the slot element that exists as both a child of the node and a child of a chassis, this can run counter to the benefits of a flat model. That is, a flat model can be designed without needing to know all rules of the hierarchy in advance and designing a model to reflect those rules.

An alternative would be to generically design an assembly model that can refer to any hierarchy of objects and children. The required depth of the hierarchy must still be achievable, referred to as a max depth. Also, the assembly model must allow for a mix of containers or lists within the hierarchy. In a simple case, containers can be lists with a single element and a special key.

| Database | Chassis | Model |
|---|---|---|
| 1 | | A |
| 2 | | B |

| Database | Slot | State |
|---|---|---|
| 3 | | Fixed |
| 1 | 1 | Removed |
| 1 | 2 | Present |
| 2 | 1 | Removed |

| Database | Port | Power |
|---|---|---|
| 3 | 1 | 2.2 |
| 2 | 2-1 | 3.3 |
| 2 | 2-2 | 4.4 |
| 1 | 1-1 | 5.5 |
| 1 | 1-1 | 6.6 |
| 1 | 1-2 | 7.7 |

| Assembly | DB | Instance-ID |
|---|---|---|
| element[0] | 4 | |
| element[0]/element[1] | 1 | /chassis |
| element[0]/element[2] | 2 | /chassis |
| element[0]/element[3] | 3 | /slot |
| element[0]/element[1]/element[1] | 3 | /port[1] |
| element[0]/element[1]/element[1] | 1 | /slot[1] |
| element[0]/element[1]/element[1]/element[1] | 1 | /port[1-1] |
| element[0]/element[1]/element[1]/element[2] | 1 | /port[1-2] |
| element[0]/element[1]/element[2] | 1 | /slot[2] |
| element[0]/element[1]/element[2]/element[1] | 1 | /port[2-1] |
| element[0]/element[2]/element[1] | 2 | /slot[1] |
| element[0]/element[2]/element[1]/element[1] | 2 | /port[1-1] |
| element[0]/element[2]/element[1]/element[2] | 2 | /port[1-2] |

In this model, all children of a node are referenced as elements within elements, no matter what the list is pointing to. Instances in the list cannot be referenced by their class or named by the native names since this could cause name collisions in the overall list. If each element has two keys, the first is a string that indicates the type of object in the list, and the second is a key constructed from the native key:

| Assembly | DB | instance-id |
|---|---|---|
| element[node,0] | 4 | |
| element[node,0]/element[chassis,1] | 1 | /chassis |
| element[node,0]/element[chassis,2] | 2 | /chassis |
| element[node,0]/element[slot,1] | 3 | /slot |
| element[node,0]/element[slot,1]/element[port,1] | 3 | /port[1] |
| element[node,0]/element[chassis,1]/element[slot,1] | 1 | /slot[1] |
| element[node,0]/element[chassis,1]/element[slot,1]/element[port,1] | 1 | /port[1-1] |
| element[node,0]/element[chassis,1]/element[slot,1]/element[port,2] | 1 | /port[1-2] |
| element[node,0]/element[chassis,1]/element[slot,2] | 1 | /slot[2] |
| element[node,0]/element[chassis,1]/element[slot,2]/element[port,1] | 1 | /port[2-1] |
| element[node,0]/element[chassis,2]/element[slot,1] | 2 | /slot[1] |
| element[node,0]/element[chassis,2]/element[slot,1]/element[port,1] | 2 | /port[1-1] |
| element[node,0]/element[chassis,2]/element[slot,1]/element[port,2] | 2 | /port[1-2] |

Once the assembly is constructed like this, the data can be accessed natively by referencing the assembly path and the path in the native hierarchy together.

| Assembly | Value |
|---|---|
| element[node,0] | |
| element[node,0]/element[chassis,1]/data/Model | A |
| element[node,0]/element[chassis,2]/data/Model | B |
| element[node,0]/element[slot,1]/data/State | Fixed |
| element[node,0]/element[slot,1]/element[port,1]/data/Power | 2.2 |
| element[node,0]/element[chassis,1]/element[slot,1]/data/State | Removed |
| element[node,0]/element[chassis,1]/element[slot,1]/element[port,1]/data/Power | 6.6 |
| element[node,0]/element[chassis,1]/element[slot,1]/element[port,2]/data/Power | 7.7 |
| element[node,0]/element[chassis,1]/element[slot,2]/data/State | Present |
| element[node,0]/element[chassis,1]/element[slot,2]/element[port,1]/data/Power | |
| element[node,0]/element[chassis,2]/element[slot,1]/data/State | Removed |
| element[node,0]/element[chassis,2]/element[slot,1]/element[port,1]/data/Power | |
| element[node,0]/element[chassis,2]/element[slot,1]/element[port,2]/data/Power | |

In this model, the elements in the assembly are generic and most assemblies can be constructed or are constructable by following rules for the hierarchy. It is possible to define rules of objects and keys that are valid for an assembly.

Efficiently Querying Assemblies

Once an assembly has been constructed it may be valuable to be able to have the data instances that are referenced by the assemblies to know which assemblies refer to them. As an assembly is created and data instances are added, a cache can be maintained for each element that can be queried to indicate which assemblies contain that data node, and where the hierarchy it is represented.

Hardware Implementation

The network element 10 can include a database in the controller 30. Further, each of the modules 12, 14, 16 can include their own processor and internal database. Even further, the management system 18 can include a database for all network elements 10 under management. The network element 10 can manage a node-level model, the modules 12, 14, 16 can manage a module-level model, and the management system 18 can manage a network-level model.

The assembly does not replace these databases and their schema, but enables flexibility to arbitrarily build models, at runtime, based thereon, i.e., enables multiple schemas in multiple hierarchies to exist at the same time. Again, the assembly does not replicate the data, but provides rearrangement of an existing schema including one that cannot be modified directly using pointers to the database instances and schemas in the original model. The assembly can reside on any of the network element 10, the modules 12, 14, 16, the controller 30, the management system 18, or in some compute resources that are communicatively coupled to the relevant databases.

The assembly allows existing schemas which do not have a concept of a higher-level entity (their view of the schema stops at the top-level root), to be instantiated in a database at a higher network management layer in a way that effectively allows root level models at a lower level to be mapped as children to higher level hierarchies at a higher layer. In terms of physical components, a circuit pack within a shelf does not need to know about a shelf, and the circuit pack's root can be mapped to a child of the shelf within the shelf. And the shelf does not need to know about a site, but at the site level, multiple shelves can have their roots mapped to child elements within the site. This can all be provided without redefining the keys at the different levels (layers) all the way down using the assembly structure. This is important for most schemas which do not allow the root level of their hierarchy to ever have a parent. The only way this can be done is by using the assembly, which allows a data-driven logical schema to point to any layer in a referenced model, including the root nodes.

The assembly allows multiple schemas to be dynamically created or destroyed at runtime based on the microservices deployed. So, a site-level controller can create an assembly that groups all ports and facilities into a logical control entity at runtime. And then when a network level controller is deployed, it can create an assembly that groups all ports and facilities (and/or site level controllers) into a higher level control entity at runtime, and it can do this without redefining the low-level schemas that already exist (e.g., so we do not need an amp on the card mapped to an amp at the shelf, mapped to an amp at the site, mapped to an amp at the network—it is all the same amp).

The assembly allows the additional metadata of ancestral dependencies to be added to databases which do not have such dependencies in their flattened schemas. For example, all optical monitoring facilities in an optical network element can be modeled in a flat list. The only relationships that can be extracted must be extracted by parsing their identifiers, to extract common components. This does not always work and always requires platform-specific code to be able to parse and construct these identifiers based on the hierarchical rules of the identifier containment. If an assembly can also be provided along with the flattened schema, the hierarchy of shelf/slot/subslot/port/subport/optical_monitoring can be represented in the assembly itself. A generic service can then determine what the true parent/child relationships are so when provisioning/creation/deletion request is received by the device, the generic orchestrator can process and validate the request based on that hierarchy without invoking platform specific parsing.

For example, different standard logical/physical representations can include a card model that is mapped and translated at each layer up the network management hierarchy. The same entity is mapped and remapped at every layer to add in additional network context and to rename the name of the entity to avoid naming collisions. Also, for a given port or facility, there are many different logical models even on the same device, that needs to take data from the "root" entity and copy content moving from one model to another. On the network element 10, there are Simple Network Management Protocol (SNMP) Management Information Bases (MIBs), service level facilities, Performance Monitoring (PM) bins, logical control points within the shelf, and logical control points at the section level. There are also port trails and section trails that represent the service level groupings associated with the physical deployment. To raise a single Loss Of Signal (LOS) alarm, the threshold crossing detected from the card to the management interface on the device is currently translated and remapped over 20 times. This is avoided with assemblies.

Advantageously, the assembly is not strictly about how to model components one way or another, but it allows the support of many components in different ways as needed, dynamically, and without duplicating or rewriting the existing schemas referenced by the assembly. And it does so in such a way that the existing tooling (YANG, NETCONF, Database, etc.) do not need to understand any new details of an implementation.

There are various modeling approaches, e.g., YANG, NETCONF, vendor-specific, customer-defined, etc. The assembly allows a single approach that supports an arbitrary number of models. For example, a vendor may support their vendor-defined model. The vendor can now provide support for new models as needed via assemblies without rewriting the vendor-defined model. The assembly can also form the basis for new ways to represent components in the controller spaces, and it will allow management of the many different schemas on the device that need to be accommodated.

Of note, this mechanism provides the best of both worlds such that an external client which has knowledge of the hierarchy can take advantage of the increased granularity of "addressability," but on the flip side, a simple client could just treat the paths as "opaque" and see the network as flat. If the scoping of domains changes dynamically, the client does not necessarily need to know. A directory service would just give it a new "opaque" path and it happily continues to operate on the same instance.

Modeling Process

Figure 5:
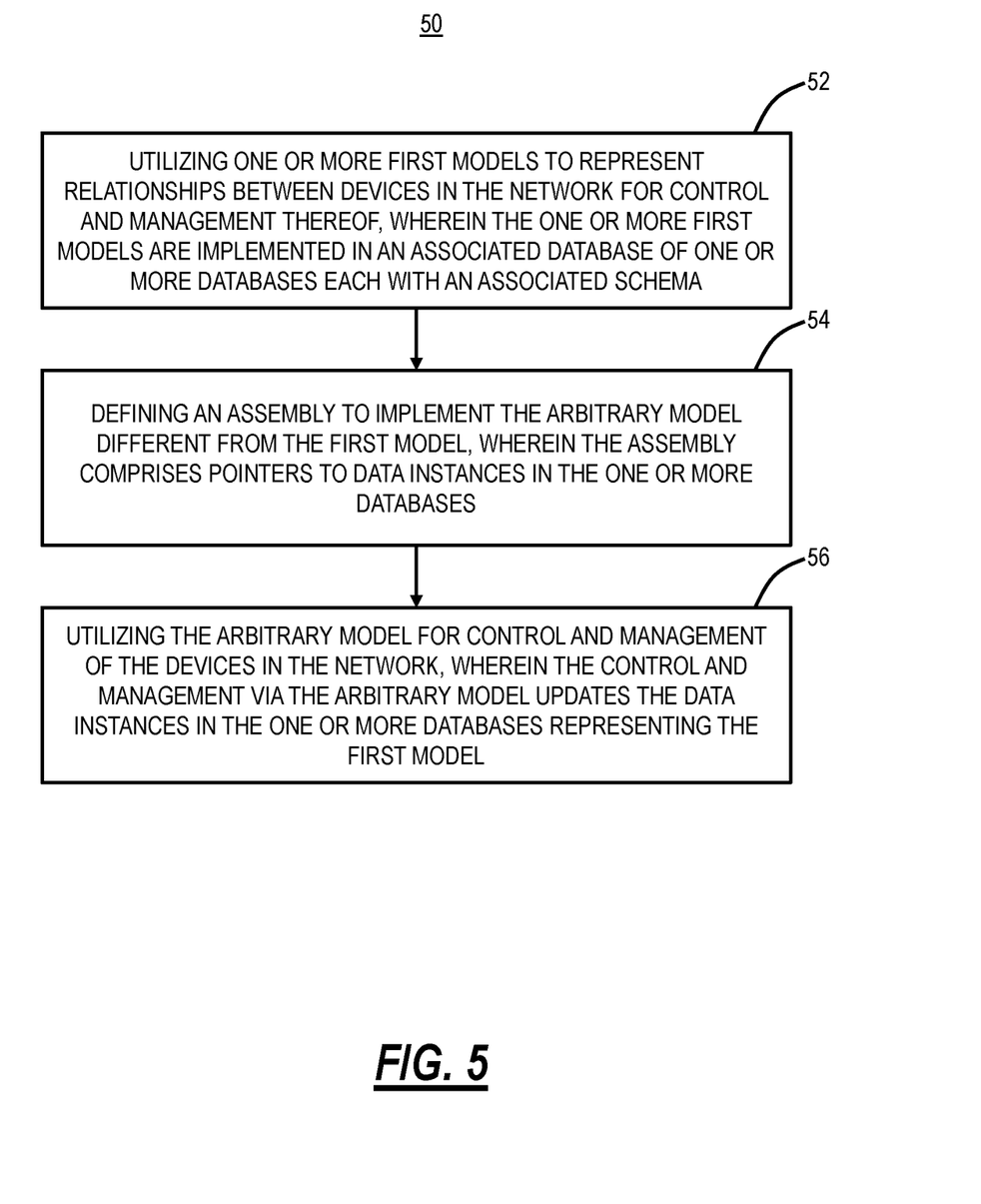
FIG. 5 is a flowchart of a processor-implemented process implemented to efficiently model devices in a network utilizing an assembly providing an arbitrary model.

FIG. 5 is a flowchart of a processor-implemented process 50 implemented to model devices in a network utilizing an assembly providing an arbitrary model. The process 50 includes utilizing one or more first models to represent relationships between devices in the network for control and management thereof, wherein the one or more first models are implemented in an associated database of one or more databases each with an associated schema (step 52); defining an assembly to implement the arbitrary model different from the first model, wherein the assembly includes pointers to data instances in the one or more databases (step 54); and utilizing the arbitrary model for control and management of the devices in the network, wherein the control and management via the arbitrary model updates the data instances in the one or more databases representing the first model (step 56).

The one or more databases can be a plurality of databases. The plurality of databases can include a database associated with a shelf, a database associated with a circuit pack, and a database associated with the network. Each of the one or more first models in the plurality of databases has an associated root level, and wherein the assembly can include a root level above the associated root level from one or more of the one or more first models. The plurality of databases can have common names which are not unique, and wherein the assembly utilizes keys which are unique. The assembly can include a flat list of objects which point to the associated data instances and to children. The one or more first models can include flat models and the arbitrary model includes a hierarchical model.

In another embodiment, an apparatus configured to efficiently model devices in a network utilizing an assembly providing an arbitrary model includes a processor; and memory storing instructions that, when executed, cause the processor to utilize one or more first models to represent relationships between devices in the network for control and management thereof, wherein the one or more first models are implemented in an associated database of one or more databases each with an associated schema, define an assembly to implement the arbitrary model different from the first model, wherein the assembly includes pointers to data instances in the one or more databases, and utilize the arbitrary model for control and management of the devices in the network, wherein the control and management via the arbitrary model updates the data instances in the one or more databases representing the first model.

In a further embodiment, a non-transitory computer-readable medium includes instructions that, when executed, cause a processor to perform the steps of utilizing one or more first models to represent relationships between devices in the network for control and management thereof, wherein the one or more first models are implemented in an associated database of one or more databases each with an associated schema; defining an assembly to implement the arbitrary model different from the first model, wherein the assembly includes pointers to data instances in the one or more databases; and utilizing the arbitrary model for control and management of the devices in the network, wherein the control and management via the arbitrary model updates the data instances in the one or more databases representing the first model.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A processor-implemented method implemented to model devices in a network utilizing an assembly providing a dynamic model, the processor-implemented method comprising:
    utilizing one or more first models to represent parent/child relationships between devices in the network for control and management thereof, wherein each of the one or more first models is implemented in an associated database of one or more databases and has an associated schema defining at least a level in a hierarchy, and wherein the devices in the network include at least one of a group of components assembled on a board, a group of boards inserted into a circuit pack, a group of circuit packs inserted into a chassis, and a group of chassis of a network element;
    defining an assembly to implement the dynamic model, wherein the assembly is a rearrangement of the associated schema of the one or more first models and does not modify the one or more first models, and wherein the assembly comprises pointers pointing to data instances in the one or more databases without pointing to data instances in the assembly; and
    utilizing the dynamic model for control and management of the devices in the network, wherein the control and management via the dynamic model updates the data instances in the one or more databases representing the one or more first models.

2. The processor-implemented method of claim 1, wherein the one or more databases comprise a plurality of databases.

3. The processor-implemented method of claim 2, wherein the plurality of databases comprise a database associated with a shelf, a database associated with a circuit pack, and a database associated with the network.

4. The processor-implemented method of claim 2, wherein each of the one or more first models implemented in the plurality of databases has an associated root level, and wherein the assembly comprises a root level above the associated root level from one or more of the one or more first models.

5. The processor-implemented method of claim 2, wherein the plurality of databases have common names which are not unique, and wherein the assembly utilizes keys which are unique.

6. The processor-implemented method of claim 1, wherein the assembly comprises a flat list of objects which point to the associated data instances and to children.

7. The processor-implemented method of claim 1, wherein the one or more first models comprise flat models and the dynamic model comprises a hierarchical model.

8. An apparatus configured to model devices in a network utilizing an assembly providing dynamic model, the apparatus comprising:
    a processor; and
    memory storing instructions that, when executed, cause the processor to
        utilize one or more first models to represent parent/child relationships between devices in the network for control and management thereof, wherein each of the one or more first models is implemented in an associated database of one or more databases and has an associated schema defining at least a level in a hierarchy, and wherein the devices in the network include at least one of a group of components assembled on a board, a group of boards inserted into a circuit pack, a group of circuit packs inserted into a chassis, and a group of chassis of a network element, define an assembly to implement the dynamic model, wherein the assembly is a rearrangement of the associated schema of the one or more first models and does not modify the one or more first models, and wherein the assembly comprises pointers pointing to data instances in the one or more databases without pointing to data instances in the assembly; and utilize the dynamic model for control and management of the devices in the network, wherein the control and management via the dynamic model updates the data instances in the one or more databases representing the one or more first models.

9. The apparatus of claim 8, wherein the one or more databases comprise a plurality of databases.

10. The apparatus of claim 9, wherein the plurality of databases comprise a database associated with a shelf, a database associated with a circuit pack, and a database associated with the network.

11. The apparatus of claim 9, wherein each of the one or more first models implemented in the plurality of databases has an associated root level, and wherein the assembly comprises a root level above the associated root level from one or more of the one or more first models.

12. The apparatus of claim 9, wherein the plurality of databases have common names which are not unique, and wherein the assembly utilizes keys which are unique.

13. The apparatus of claim 8, wherein the assembly comprises a flat list of objects which point to the associated data instances and to children.

14. The apparatus of claim 8, wherein the one or more first models comprise flat models and the dynamic model comprises a hierarchical model.

15. A non-transitory computer-readable medium comprising instructions that, when executed, cause a processor to perform the steps of:

utilizing one or more first models to represent parent/child relationships between devices in the network for control and management thereof, wherein each of the one or more first models is implemented in an associated database of one or more databases and has an associated schema defining at least a level in a hierarchy, and wherein the devices in the network include at least one of a group of components assembled on a board, a group of boards inserted into a circuit pack, a group of circuit packs inserted into a chassis, and a group of chassis of a network element;

defining an assembly to implement the dynamic model, wherein the assembly is a rearrangement of the associated schema of the one or more first models and does not modify the one or more first models, and wherein the assembly comprises pointers pointing to data instances in the one or more databases without pointing to data instances in the assembly; and utilizing the dynamic model for control and management of the devices in the network, wherein the control and management via the dynamic model updates the data instances in the one or more databases representing the one or more first models.

16. The non-transitory computer-readable medium of claim 15, wherein the one or more databases comprise a plurality of databases.

17. The non-transitory computer-readable medium of claim 16, wherein the plurality of databases comprise a database associated with a shelf, a database associated with a circuit pack, and a database associated with the network.

18. The non-transitory computer-readable medium of claim 16, wherein each of the one or more first models implemented in the plurality of databases has an associated root level, and wherein the assembly comprises a root level above the associated root level from one or more of the one or more first models.

19. The non-transitory computer-readable medium of claim 16, wherein the plurality of databases have common names which are not unique, and wherein the assembly utilizes keys which are unique.

20. The non-transitory computer-readable medium of claim 15, wherein the assembly comprises a flat list of objects which point to the associated data instances and to children.

* * * * *